Figure 1:
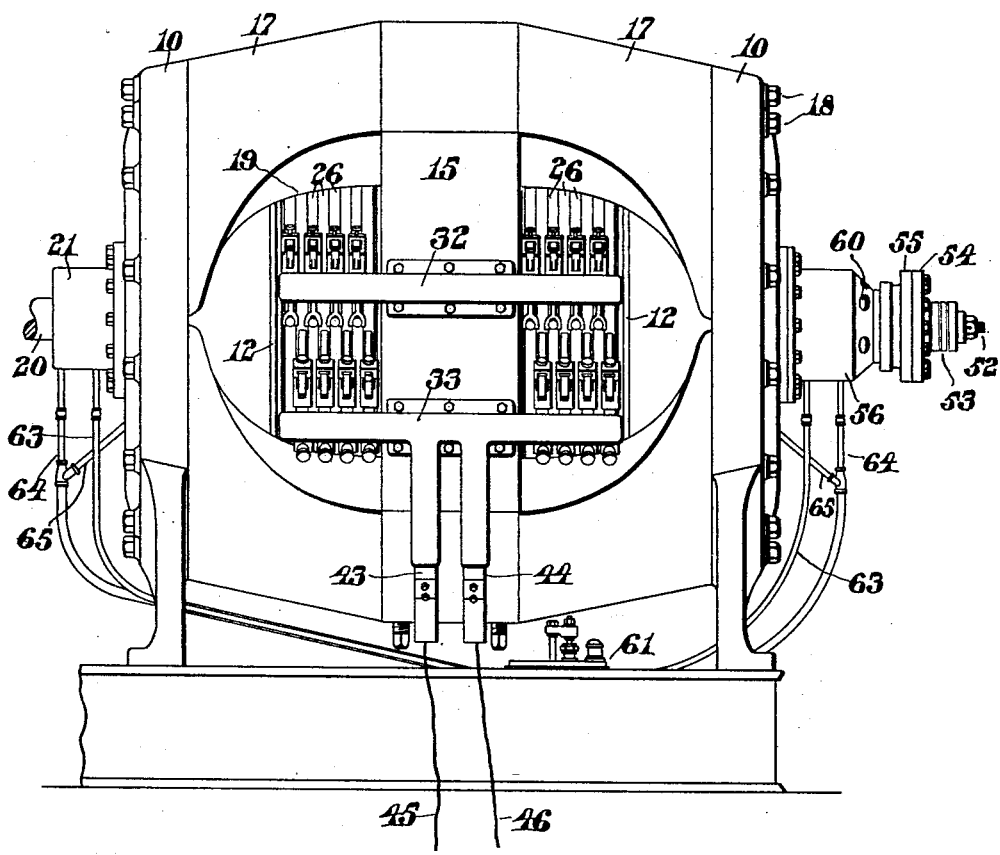

BEST AVAILABLE COP'.

D. H. ANDREWS & E. C. KETCHUM.
DYNAMO ELECTRICAL MACHINE.
APPLICATION FILED JAN. 31, 1912.

1,082,579.

Patented Dec. 30, 1913.
4 SHEETS—SHEET 1.

Witnesses:
Edward F. Allen.
Nathan C. Lombard

Inventors:
David H. Andrews;
Ernest C. Ketchum,
by Walter E. Lombard
Atty.

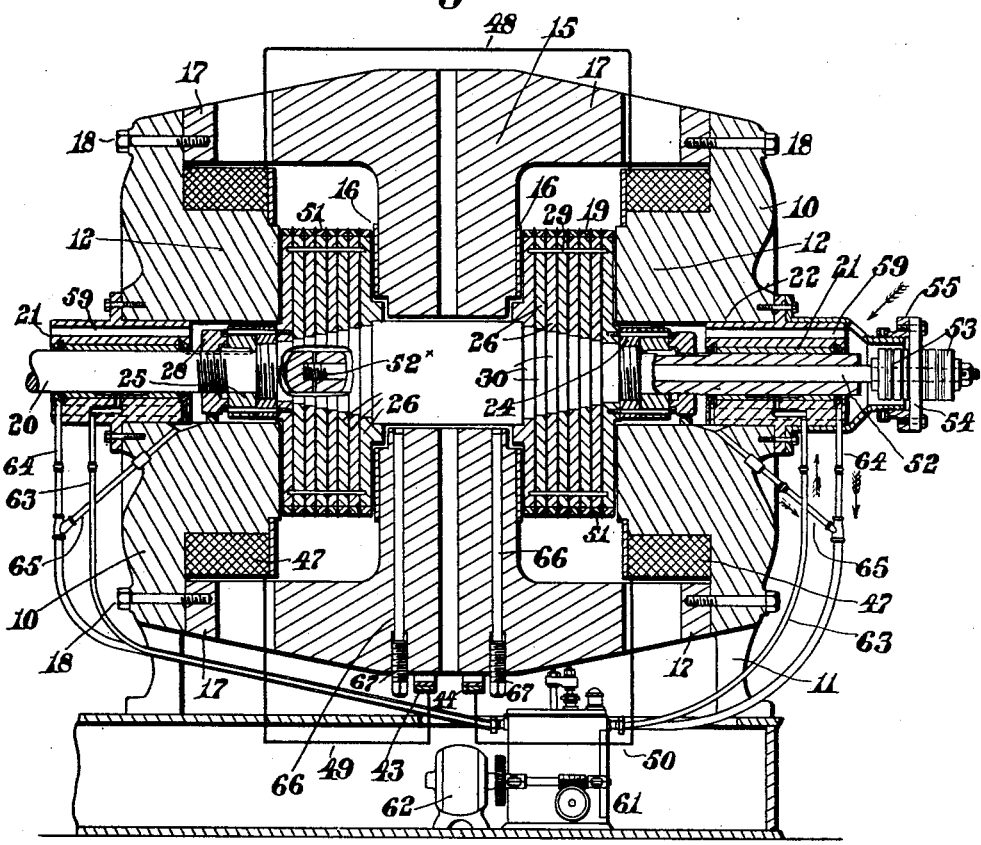
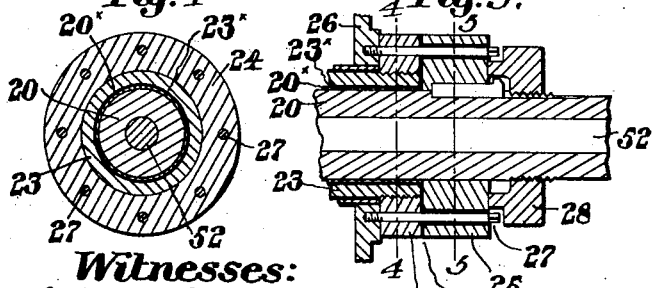
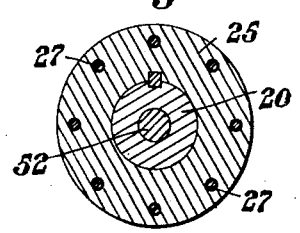

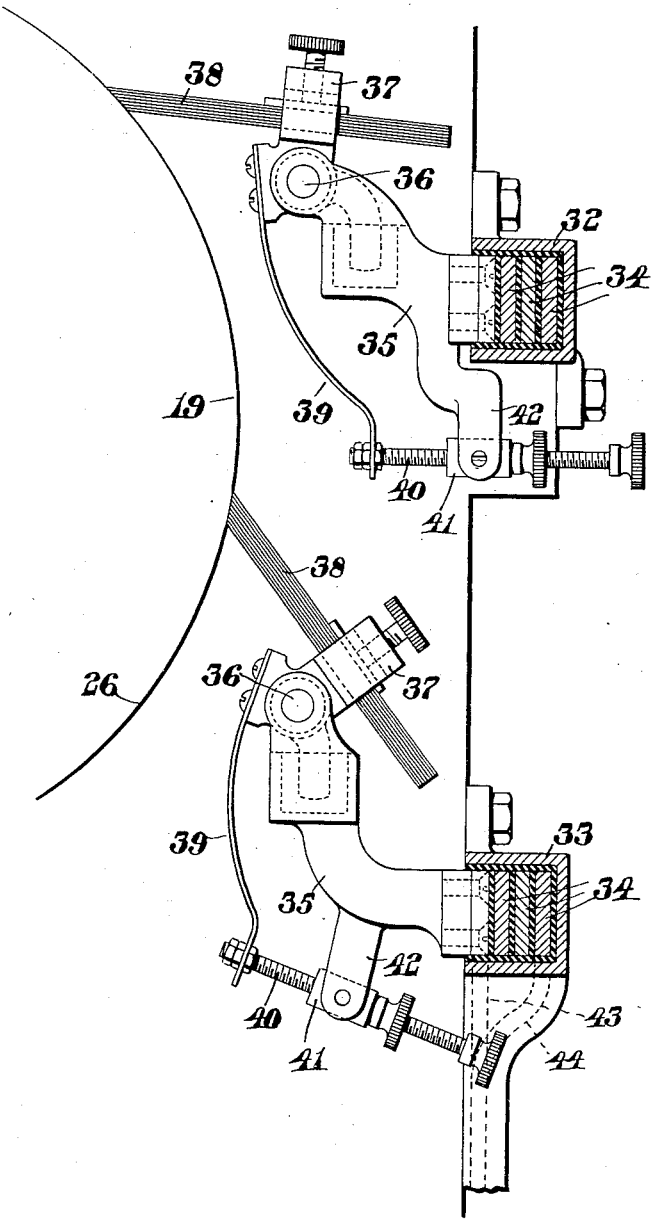

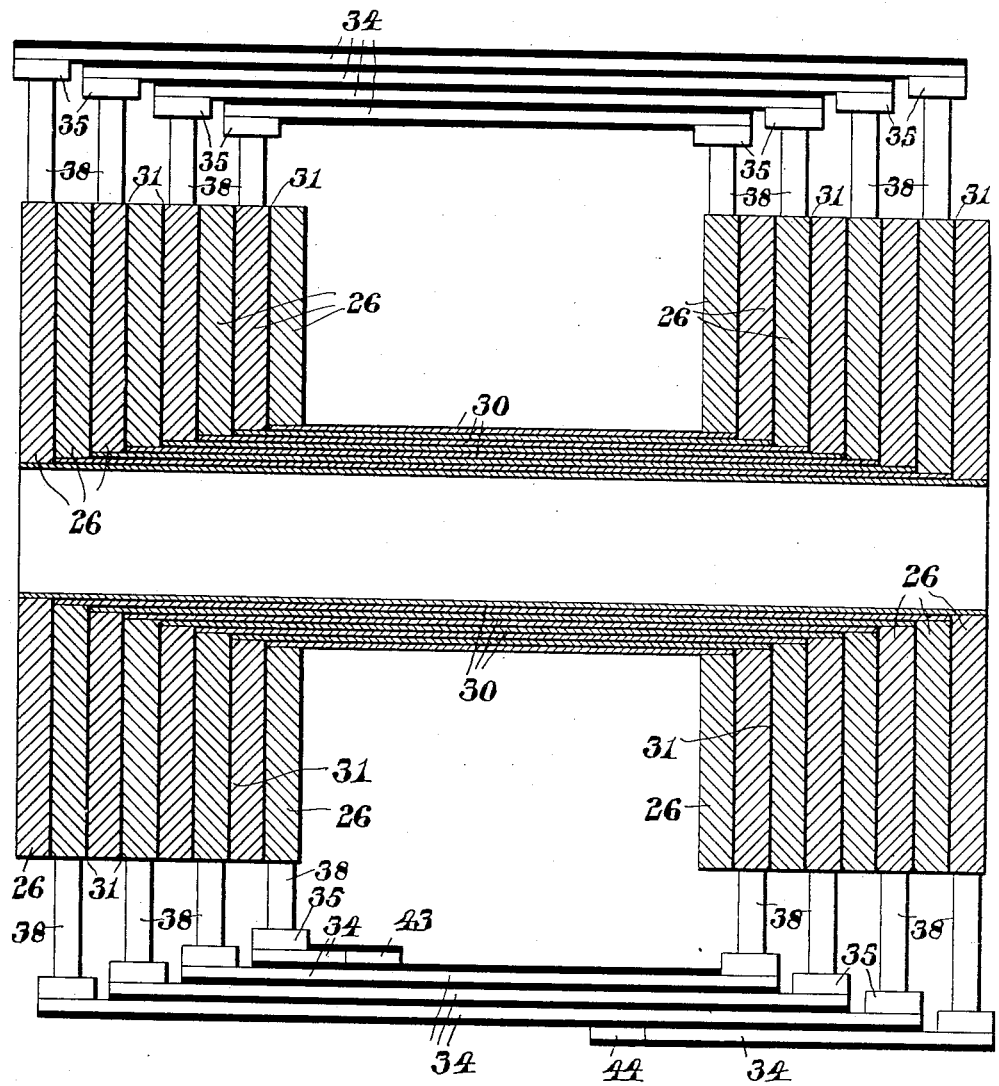

UNITED STATES PATENT OFFICE.

DAVID H. ANDREWS, OF NEWTON, AND ERNEST C. KETCHUM, OF BOSTON, MASSACHUSETTS.

DYNAMO-ELECTRICAL MACHINE.

1,082,579.  Specification of Letters Patent.  Patented Dec. 30, 1913.

Application filed January 31, 1912. Serial No. 674,822.

*To all whom it may concern:*

Be it known that we, DAVID H. ANDREWS and ERNEST C. KETCHUM, citizens of the United States of America, and residents of Newton, in the county of Middlesex and State of Massachusetts, and Boston, in the county of Suffolk and State of Massachusetts, respectively, have invented certain new and useful Improvements in Dynamo-Electrical Machines, of which the following is a specification.

This invention relates to dynamo electrical machines and has for its object the production of such a machine in which the armature may be driven direct at a great velocity from high speed motors, such as turbine engines, without endangering the displacement of any of the elements of said armature.

One of the principal objects of the present invention is the provision of means for retaining the armature centrally disposed between the faces of the poles during the expansion and contraction of the shaft upon which it is supported.

Another object of the invention is the provision of an improved means for supporting the various brushes coacting with the armature disks and connecting them in series through the brush supporting members, said supporting means consisting in part of a plurality of bars insulated from each other and having their ends in echelon.

The invention consists in certain novel features of construction and arrangement of parts which will be readily understood by reference to the drawings and to the claims hereinafter given.

Of the drawings: Figure 1 represents a front elevation of a machine embodying the features of this invention, Fig. 2 represents a longitudinal vertical section of the same, Fig. 3 represents an enlarged longitudinal section of the various members for supporting one end of the armature, Fig. 4 represents a transverse section of the same, the cutting plane being on line 4—4 on Fig. 3. Fig. 5 represents a transverse section of the same, the cutting plane being on line 5—5 on Fig. 3. Fig. 6 represents an enlarged sectional detail showing two sets of insulated bars and the supports therefor, together with the yielding brushes secured thereto and contacting with the armature, and Fig. 7 represents a diagram showing means for electrically connecting the various disks of the armature in pairs and other means for electrically connecting said disks in series.

Similar characters designate like parts throughout the several figures of the drawings.

In the drawings, 10 represents end pieces supported by suitable legs 11 and provided with inwardly extending cylindrical hubs 12 which form cores or poles for the field. Interposed between said end pieces 10 is a member 15, either face of which is provided with a pole 16 in alinement with each other, and with the poles 12 of the end pieces 10. This member 15 has formed thereon a plurality of extensions 17 connected to the end pieces 10 by means of a plurality of bolts 18. Interposed between the poles 12 and 16, and separated therefrom by suitable air spaces, is an armature 19, said armature being driven by a shaft 20 revoluble in suitable bearings 21 secured to the end pieces 10 and provided with alined hubs 22 extending partially through said end pieces. Surrounding and freely movable endwise of said revoluble shaft 20 is a sleeve $20^x$ upon which is mounted a tubular member 23 separated therefrom by the insulation $23^x$ and having threaded to either end a nut 24. Keyed to the shaft 20 beyond the outer face of each nut 24 and the end of the tubular member 23 is a collar 25, separated from these members 23 and 24 by means of an insulating disk $26^x$.

Threaded to the outer disks 26 of the armature 19 are a plurality of bolts or similar members 27 extending through the collar 25 and insulated therefrom as indicated clearly in Fig. 3 of the drawings. By means of this construction whereby the disks 26 are clamped between the nuts 24 on the tubular member 23, the entire armature 19 may be removed from the shaft 20 without being dismantled.

Threaded to the shaft 20 are the nuts 28, each bearing against the outer face of a collar 25 and retaining said collar 25 and disk 26 in contact with the end faces of the tubular member 23 and nut 24. It is obvious that the revolution of the shaft 20 will cause, through the keyed collar 25 and the bolts 27 threaded to the outer disk 26 of the armature 19, the rotation of said armature with said revoluble shaft.

Near the peripheries of the disks 26 of the armature 19 and extending through each set thereof are the pins 29 made of insulating material or of other material insulated from said disks, these members 29 serving to cause the rotation of the disks 26 in unison and prevent one from slipping upon the other.

Mounted upon but insulated from the tubular member 23 are a plurality of cylindrical members 30, each insulated from the other. The inner cylindrical members are of greater length than those superimposed thereon, and each end of these members extends beyond the ends of the cylindrical member surrounding it. On each end of each member is secured in electric contact therewith a disk 26, these cylindrical members thereby electrically connecting the various disks 26 of the armature 19 in pairs. The various disks 26 of the armature are separated from each other by means of the insulating disks 31.

Bolted to the member 15 are two supporting boxes 32 and 33, open on their inner sides, that is, the side next to the armature 19, as clearly indicated in Fig. 6 of the drawings. Mounted in and insulated from the boxes 32 and 33 are a plurality of metal bars 34, these bars being also insulated from each other. The bars 34 are of different lengths with their ends in echelon, the ends of the outer bars 34 extending beyond the inner bars. To the outer end of each bar is secured a bracket 35 having pivoted at 36 a holder 37 carrying a brush 38 adapted to contact with one of the disks 26 of the armature 19. The holder 37 has secured thereto a spring 39 in the free end of which is revolubly mounted a member 40 threaded to a nut 41 pivoted in lugs, forming a part of the bracket 35. By adjusting the member 40 the tension of the spring 39 may be regulated to secure any degree of yielding contact between the brush 38 and the periphery of a disk 26 of the armature 19. The brushes 38 supported by the bars in the upper box 32 contact with alternate disks 26 of the armature 19 as indicated in the upper part of the diagram shown in Fig. 7 of the drawings, while the brushes 38 supported by the bars in the lower box 33 contact with the disks 26 intermediate to the disks with which the upper brushes contact. By referring to the diagram shown in Fig. 7 of the drawings, it is self-evident that by this arrangement of bars and supported brushes, the various disks and cylindrical members 30 are electrically connected in series. The inner bar 34 of the lower set is electrically connected with a terminal bar 43 while the outer bar 34 is electrically connected with the other terminal 44. These terminals 43 and 44 extend downwardly and have connected therewith main conducting wires 45 and 46 to convey an electric current to any desired point. Each of the poles 12 is surrounded by coils 47 which are connected together by a wire 48, and are connected respectively by the wires 49 and 50 with the terminals 43 and 44.

The shaft 20 is driven direct by means of any suitable high speed motor, and the armature 19 supported thereon is composed, as has been previously stated, of a plurality of disks 26, these disks being of high magnetic permeability and separated from each other by the insulating plates 31. These disks 26, as has been stated, are connected together in pairs by means of suitable cylindrical or tubular members 30 insulated from each other and from the shaft 20 upon which they are supported, all substantially as shown and described in Letters Patent No. 826,668, issued to Ernest C. Ketchum, on July 24, 1906. The disks are of steel, and are each provided with an annular peripheral band 51 of copper, which serves to conduct the current of electricity quickly to and from all portions of the periphery of said disks, from which it moves in radial line to and from the center where it flows through a cylindrical or tubular member 30. It is obvious that all of the disks 26 are insulated from those adjacent thereto, and all of the tubular members 30 are in like manner insulated from each other so that the disks 26 are connected together in pairs and a current of electricity may pass from one end disk to the opposite end disk, and the second disk in a like manner is connected with the second disk from the opposite end. The bars 34 are insulated from each other and from the boxes 32 and 33 supporting them, and the brushes 38 are so mounted upon the faces of said bars 34 that a current of electricity passing from the terminal 43 will pass through the inner lower bar 34 and its brush 38 to the left hand inner disk 26 on Fig. 7 of the drawings, and then will pass through the outer tubular member 30 to the right end inner disk 26 from which disk it will pass through the brush 38 on the inner upper bar 34, said upper inner bar, and the brush 38 on its opposite end to the disk next to the inner left hand disk before mentioned. The circuit will be continued in this same manner to connect all of the disks in series, the current finally passing through the outer right hand disk 26 to its coacting brush 38 and to the outer lower bar 34 and its terminal 44. As the shaft 20 is revolved by means of any suitable high speed motor an electric current will be generated thereby through the field coil which will build up the field and cause the lines of force to be materially increased as they move inwardly from the positive poles 12 to the negative poles 16, a complete circuit of these lines of force being made through the intermediate member 15 and the extensions 17, forming a part thereof, back to said poles 12. It will be seen that as the poles are all in alinement and the armature is in alinement therewith, the working parts of the armature when in operation will always move in a plane at right angles to the lines of force, and are constantly cutting the same without producing a reversal of the current and a change of polarity in the armature. By this arrangement whereby the movement of the armature is always at right angles to the lines of force in the field, the eddy currents and other losses which are frequent in other types of dynamos are entirely eliminated in a machine of this construction. By providing an armature in which wires are entirely dispensed with, the armature is permitted to revolve at a high velocity without endangering the displacement of any of the elements which form the same. It is intended that the shaft 20 should be in perfect alinement and that the periphery of the disks forming the armature thereon should be concentric with the axis thereof. The brush holders secured to the bars 34 are so constructed that by the adjustment of the threaded member 40 the brushes may be readily removed from contact with the armature disks 26 when desired, and when in contact therewith they will yield readily when passing over any irregularity in the surface thereof.

One of the main difficulties found to exist in machines of this class is due to the fact that when the shaft 20 becomes heated and expands, the armature supported thereby is moved out of a central position intermediate the poles 12, thereby causing an imperfect operation of the dynamo due to an excessive load upon the thrust bearings. One of the main objects of the present invention is to overcome this objection, and to accomplish this object and retain the armature centrally disposed between the poles 12 under all conditions the shaft 20 is provided with a central bore extending from one end thereof nearly through the armature 19, as indicated in Fig. 2 of the drawings. In this bore is mounted a smaller shaft 52, said smaller shaft 52 having its inner end secured to the outer shaft 20 as indicated at 52ˣ. This shaft 52 is only connected to the outer shaft at its inner end, and is free to move endwise in the bore of the shaft 20 throughout the remainder of its length. The two shafts are made of different metals having different degrees of expansibility, and preferably the smaller shaft 52 has a lower degree of expansibility than the main shaft 20, so that when said shaft 20 commences to expand in such a manner as to move the armature mounted thereon toward the right in Fig. 2, the expansion of the shaft 52 mounted therein will tend to move said armature through its connection with the shaft 20 at 52ˣ in an opposite direction, inasmuch as the shaft 52 is prevented from moving to the right in Fig. 2 by the anti-friction members 53 secured thereon and acting upon the end plate 54 secured to an annular member 55 threaded to a tubular support 56 secured to one of the end pieces 10 by means of the bolts 57. In practice the shaft 20 is made of machinery steel and the smaller shaft 52 is composed of an alloy of steel and nickel, 35% of the latter being used. It is obvious, however, that other metals may be used equally as well. The threaded member 55 is locked in its adjusted position by means of the nut 58. The members 53 acting upon this plate 54 take care of any end thrust of the combined shafts 20 and 52 in either direction. The shaft 20 is free to move longitudinally of the bearing 21 at the left of Fig. 2 so that buckling of the connected shafts 20—52 is prevented. When the shaft 52 expands it will tend to move the entire armature to the left in Fig. 2 on account of the outer end of this shaft being immovable, and unless some means to compensate for this expansion is provided for an imperfect operation of the machine would result. It is evident from an inspection of the drawings that the armatures 19 are mounted on and secured to the shaft 20 and that this shaft 20, being secured to the shaft 52 at 52ˣ, in expanding will move to the right in Fig. 2 from the point 52ˣ. If the shaft 20 had the same expansibility as the shaft 52 it is evident that it would expand to the right of 52ˣ only as much as the same length of the shaft 52 has moved to the left and consequently one end of the armature would be nearer the face of a pole piece 12 than the opposite end is to the face of the end pole 12 adjacent thereto. Consequently this outer shaft 20 is made of a different metal and one that has a greater degree of expansibility than the shaft 52 and which will expand sufficiently more than the inner shaft to permit the ends of the armature 19 to be equidistant at all times from the faces of the pole pieces 12 adjacent to the outer ends of said armature. This is the most important feature of the present invention, as it has been found in practice that by this construction the objections heretofore found to exist are wholly overcome. Some difficulty has also been found to exist in dynamos of this type owing to the overheating of the various operating parts, and in order to obviate this difficulty the bearings 21 are provided with a plurality of openings 59 extending therethrough, while the tubular support 56 is provided with openings 60 for the admission of air or some other cooling medium. As the armature revolves at a high rate of speed the air is drawn through openings 60 and 59 and passes through the spaces between the outer faces of the sets of disks and the poles 12 and 16. This has been found to be very beneficial and to greatly increase the effectiveness of the dynamo.

In order to thoroughly lubricate the bearings 21 in which the shaft 20 revolves, it has been found necessary to provide a pump 61 driven by a suitable motor 62. This pump 61 forces oil through a pipe 63 into the center of the bearing 21, thereby effecting a thorough lubrication of the same, while through the pipes 64 and 65 communicating with the ends of said bearings, the oil is returned to the pump to be used over again.

In the intermediate member 15 are mounted in alinement with the axis of the shaft 20 the supporting members 66 having enlarged ends 67 threaded to said member 15 so that they may be adjusted upwardly to support the shaft 20 when it is desired to remove either of the bearings 21 for the purpose of cleaning, adjusting, or repairing.

It is believed that the operation and many advantages of the invention will be thoroughly understood without any further description.

Having thus described our invention, we claim:

1. In a dynamo electrical machine, the combination of a field magnet having alined pole pieces with parallel faces; a revoluble shaft extending through the poles thereof; two sets of separated metal disks mounted thereon parallel with the faces of said poles; members connecting the disks in pairs; two supporting members mounted upon said field magnet; a plurality of bars in said members insulated therefrom and from each other with their ends in echelon; brush holders secured to the ends of said members; and brushes in said holders bearing on the said disks to connect said disks in series.

2. In a dynamo electrical machine, the combination of a field magnet having alined pole pieces with parallel faces; a revoluble shaft extending through the poles thereof; two sets of separated metal disks mounted thereon parallel with the faces of said poles; members connecting the disks in pairs; two supporting members mounted upon said field magnet; a plurality of bars in said members insulated therefrom and from each other with their ends in echelon; brush holders secured to the ends of said members; and brushes in said holders bearing on the said disks to connect said disks in series, the said brushes in each supporting member contacting with alternating disks intermediate to those with which the brushes of the other set of holders contact.

3. In a dynamo electrical machine, the combination of a field magnet having alined pole pieces with parallel faces; a revoluble shaft extending through the poles thereof; two sets of separated disks mounted thereon parallel with the faces of said poles; members connecting the disks in pairs; an elongated box support having the side next to the disks open; a plurality of bars therein insulated from each other and from said box with their ends in echelon; brush holders secured to the ends of said bars; and brushes in said holders bearing on said disks to connect said disks in series.

4. In a dynamo electrical machine, the combination of a field magnet; a revoluble shaft extending through the poles thereof; two sets of separated disks in pairs; two elongated box supports one above the other each having the side next to the disks open; a plurality of bars in each of said boxes insulated from each other and from said boxes with their ends in echelon; brush holders secured to the ends of said bars; brushes in the upper set of holders bearing upon alternate disks; brushes in the lower set of holders bearing upon the intermediate disks to connect all of said disks in series; and terminals connected to the inner and outer bars of the lower set of bars.

5. In a dynamo electrical machine, the combination of a field magnet having alined pole pieces with parallel faces; a revoluble shaft extending through the poles thereof; two sets of separated metal disks mounted thereon parallel with the faces of said poles; members connecting said disks in pairs; other means for electrically connecting said disks of the two sets in series; and a threaded member beneath said revoluble shaft adapted to be adjusted into position to support said shaft under abnormal conditions.

6. In a dynamo electrical machine, the combination of a field magnet having alined pole pieces with parallel faces; a revoluble shaft extending through the poles thereof; a tubular member surrounding said shaft but movable endwise thereof; a nut secured to each end of said tubular member; a collar on and keyed to said shaft beyond each end of said tubular member; members projecting from said nuts through said collars but insulated from the latter; means for preventing end movement of said tubular member on said shaft; two sets of separated disks on said tubular member parallel with the faces of said poles; members connecting said disks in pairs; and other means for electrically connecting said disks of the two sets in series.

7. In a dynamo electrical machine, the combination of a field magnet having alined pole pieces with parallel faces; a revoluble shaft extending through the poles thereof; a tubular member surrounding said shaft but movable endwise thereof; a nut secured to each end of said tubular member; a collar on and keyed to said shaft beyond each end of said tubular member; members projecting from said nuts through said collars but insulated from the latter; a nut threaded to said shaft to retain said collars normally against the ends of said tubular members; two sets of separated disks on said tubular member parallel with the faces of said poles; members connecting said disks in pairs; and other means for electrically connecting said disks of the two sets in series.

8. In a dynamo electrical machine, the combination of a field magnet having alined pole pieces with parallel faces; a revoluble shaft extending through the poles thereof and provided with a central bore extending longitudinally thereof; a smaller shaft within said bore and secured at its inner end to said bored shaft; means coacting with the outer end of said smaller shaft to care for any end thrust of said shafts; two sets of metal disks mounted upon said bored shaft parallel with the faces of said poles; members connecting said disks in pairs; and other means for electrically connecting said disks in series.

9. In a dynamo electrical machine, the combination of a field magnet having alined pole pieces with parallel faces; a revoluble shaft extending through the poles thereof and provided with a central bore extending longitudinally thereof; a smaller shaft within said bore and secured at its inner end to said bored shaft but elsewhere disconnected therefrom; means coacting with the outer end of said smaller shaft to care for any end thrust of said shafts; two sets of metal disks mounted upon said bored shaft parallel with the faces of said poles; members connecting said disks in pairs; and other means for electrically connecting said disks in series.

10. In a dynamo electrical machine, the combination of a field magnet having alined pole pieces with parallel faces; a revoluble shaft extending through the poles thereof and provided with a central bore extending longitudinally thereof; a smaller shaft within said bore and secured at its inner end to said bored shaft and having a different degree of expansibility than that of the larger shaft; means coacting with the outer end of said smaller shaft to care for any end thrust of said shafts; two sets of metal disks mounted upon said bored shaft parallel with the faces of said poles; members connecting said disks in pairs; and other means for electrically connecting said disks in series.

11. In a dynamo electrical machine, the combination of a field magnet having alined poles pieces with parallel faces; a revoluble shaft extending through the poles thereof and provided with a central bore extending longitudinally thereof; a smaller shaft within said bore and secured at its inner end to said bored shaft and having a lower degree of expansibility than that of the larger shaft; means coacting with the outer end of said smaller shaft to care for any end thrust of said shafts; two sets of metal disks mounted upon said bored shaft parallel with the faces of said poles; members connecting said disks in pairs; and other means for electrically connecting said disks in series.

12. In a dynamo electrical machine, the combination of a field magnet having alined pole pieces with parallel faces; a revoluble shaft extending through the poles thereof and provided with a central bore extending longitudinally thereof; a smaller shaft within said bore secured at its inner end to said bored shaft, said smaller shaft and bored shaft being of different metals; means coacting with the outer end of said smaller shaft to care for any end thrust of said shafts; two sets of metal disks mounted upon said bored shaft parallel with the faces of said poles; members connecting said disks in pairs; and other means for electrically connecting said disks in series.

13. In a dynamo electrical machine, the combination of a field magnet having alined pole pieces with parallel faces; a revoluble shaft extending through the poles thereof and provided with a central bore extending longitudinally thereof; a smaller shaft within said bore secured at its inner end to said bored shaft, said smaller shaft and bored shaft being of metals having different degrees of expansibility; means coacting with the outer end of said smaller shaft to care for any end thrust of said shafts; two sets of metal disks mounted upon said bored shaft parallel with the faces of said poles; members connecting said disks in pairs; and other means for electrically connecting said disks in series.

14. In a dynamo electrical machine, the combination of a field magnet having alined pole pieces with parallel faces; a revoluble shaft extending through the poles thereof and provided with a central bore extending longitudinally thereof; a smaller shaft within said bore secured at its inner end to said bored shaft; means coacting with the outer end of said smaller shaft to care for any end thrust of said shafts in either direction; two sets of metal disks mounted upon said bored shaft parallel with the faces of said poles; members connecting said disks in pairs; and other means for electrically connecting said disks in series.

15. In a dynamo electrical machine, the combination of a field magnet having alined pole pieces with parallel faces; a revoluble shaft extending through the poles thereof; two sets of separated metal disks mounted thereon parallel with the faces of said poles; members connecting said disks in pairs; other members connecting the disks of the two sets in series; and means for retaining said disks centrally disposed between the end poles during the expansion of said shaft.

16. In a dynamo electrical machine, the combination of a field magnet having alined pole pieces with parallel faces; a revoluble shaft extending through the poles thereof; two sets of separated metal disks mounted thereon parallel with the faces of said poles; members connecting said disks in pairs; other members connecting the disks of the two sets in series; means for retaining said disks centrally disposed between the end poles during the expansion of said shaft; and means for withstanding the end thrust of said shaft in either direction.

17. In a dynamo electrical machine, the combination of a field magnet; two sets of separated metal disks centrally positioned between the faces of the poles thereof; members connecting said disks in pairs; other means for connecting the disks of the two sets in series; and a two-part revoluble support for said disks adapted to expand in opposite directions and retain said disks in said central position between the end poles during said expansion.

18. In a dynamo electrical machine, the combination of a field magnet; two sets of separated metal disks centrally positioned between the faces of the end poles thereof; members connecting said disks in pairs; other means for connecting the disks of the two sets in series; and a two-part revoluble support for said disks the parts of which are adapted to expand unequally in opposite directions and retain said disks in said central position during said expansion.

19. In a dynamo electrical machine, the combination of a field magnet; two sets of separated metal disks centrally positioned between the faces of the end poles thereof; members connecting said disks in pairs; other means for connecting the disks of the two sets in series; and a two-part revoluble support for said disks connected together at a point intermediate the ends of one of said parts and adapted to expand in opposite directions and retain said disks in said central position during said expansion.

Signed by us at 4 Post Office Sq., Boston, Mass., this 29th day of January, 1912.

DAVID H. ANDREWS.
ERNEST C. KETCHUM.

Witnesses:
WALTER E. LOMBARD,
NATHAN C. LOMBARD.

---

Copies of this patent may be obtained for five cents each, by addressing the "Commissioner of Patents, Washington, D. C."